May 7, 1940.   H. C. LIMBACH   2,199,919
LAWN MOWER
Filed June 28, 1937   4 Sheets-Sheet 1
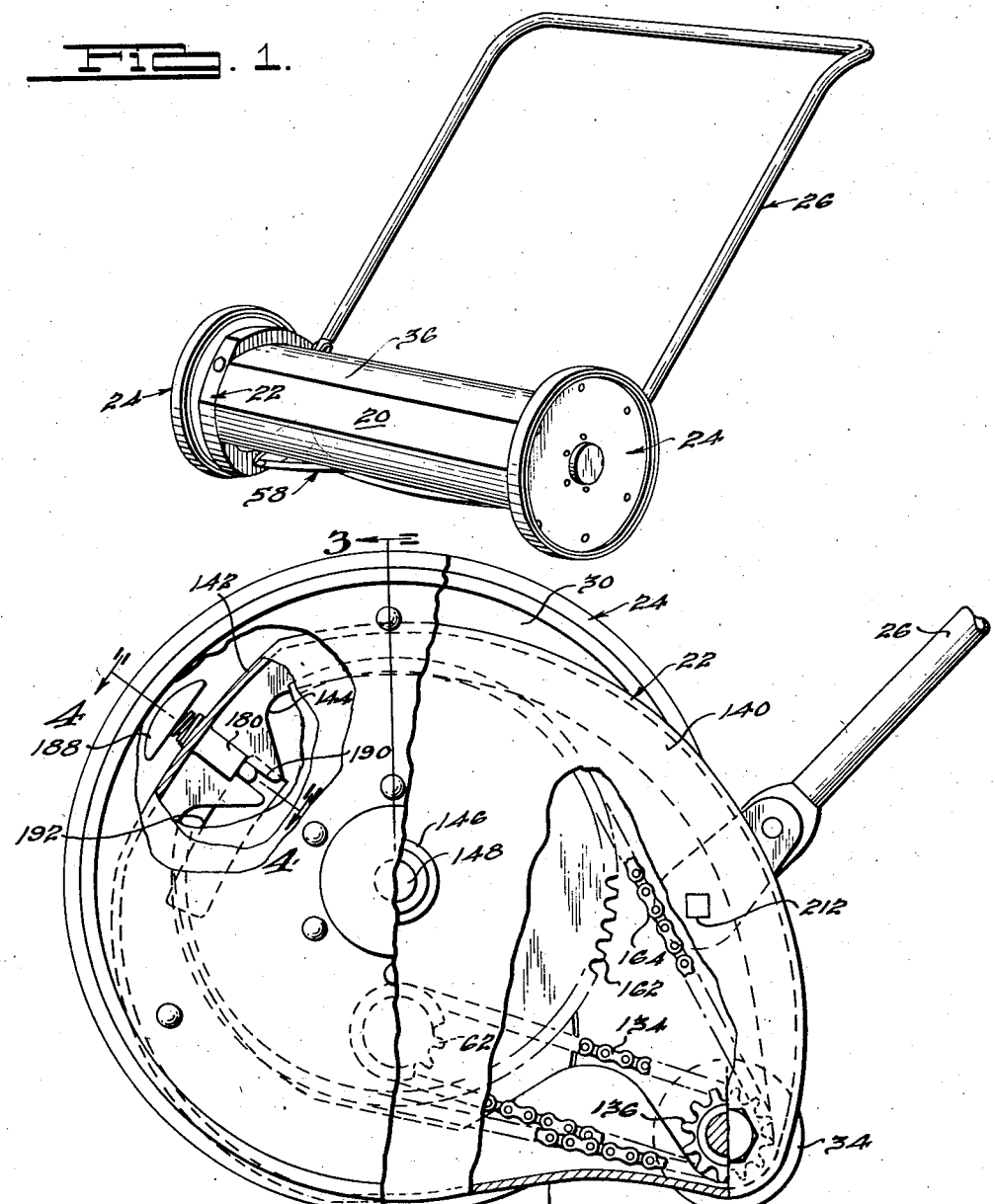
INVENTOR
Henry C. Limbach.
BY
Harness, Dickey & Pierce.
ATTORNEYS.

May 7, 1940.  H. C. LIMBACH  2,199,919
LAWN MOWER
Filed June 28, 1937  4 Sheets-Sheet 2
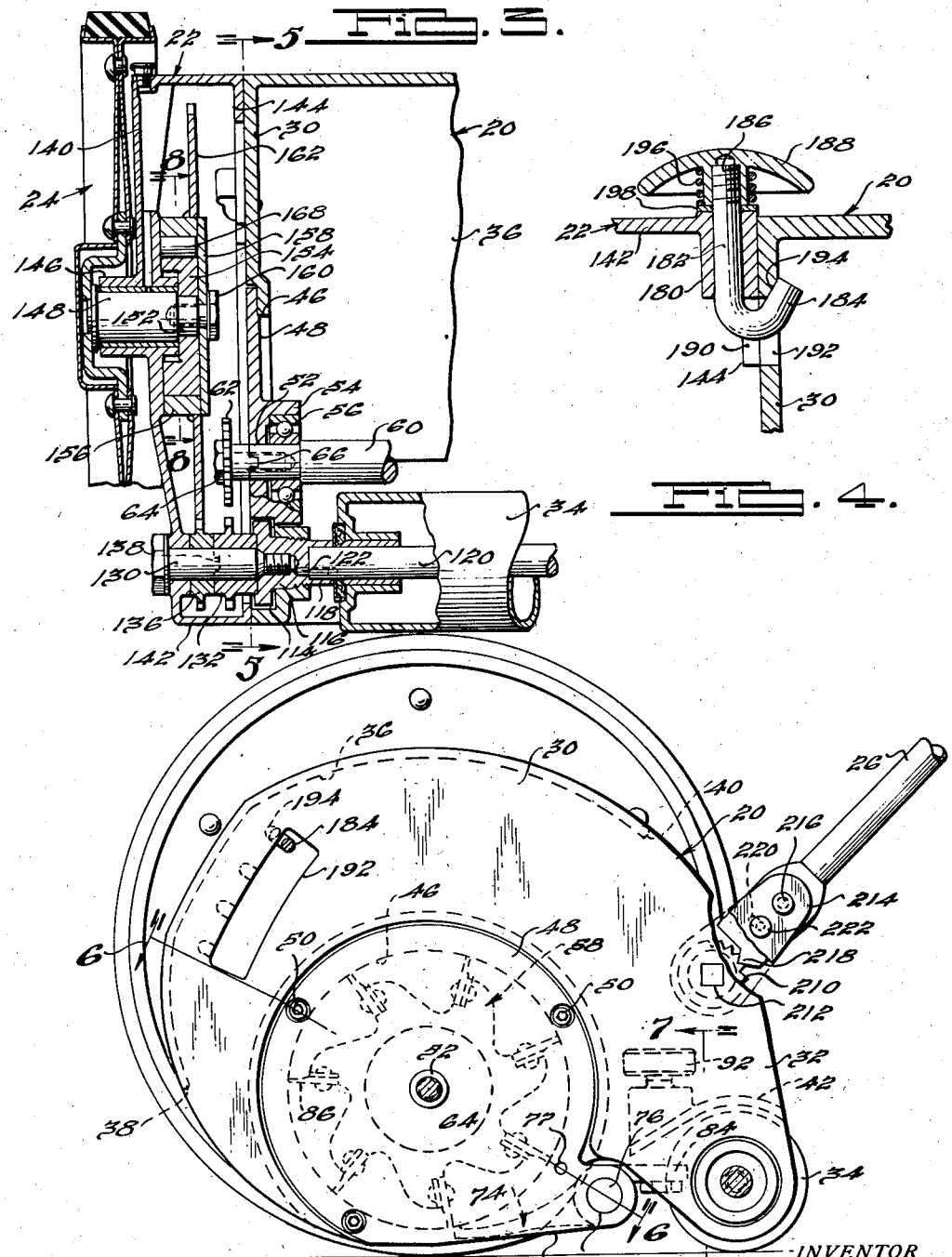
INVENTOR
Henry C. Limbach.
BY Harness, Dickey & Pierce
ATTORNEYS.

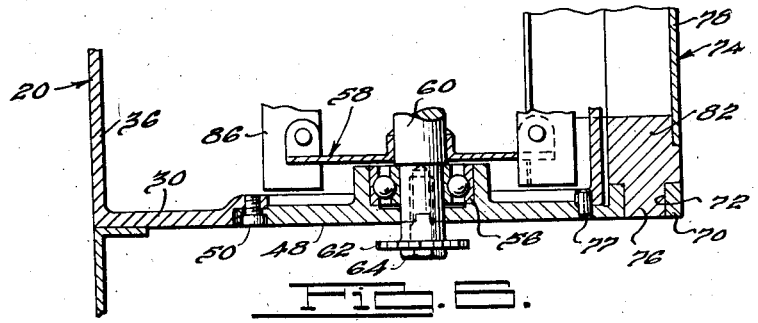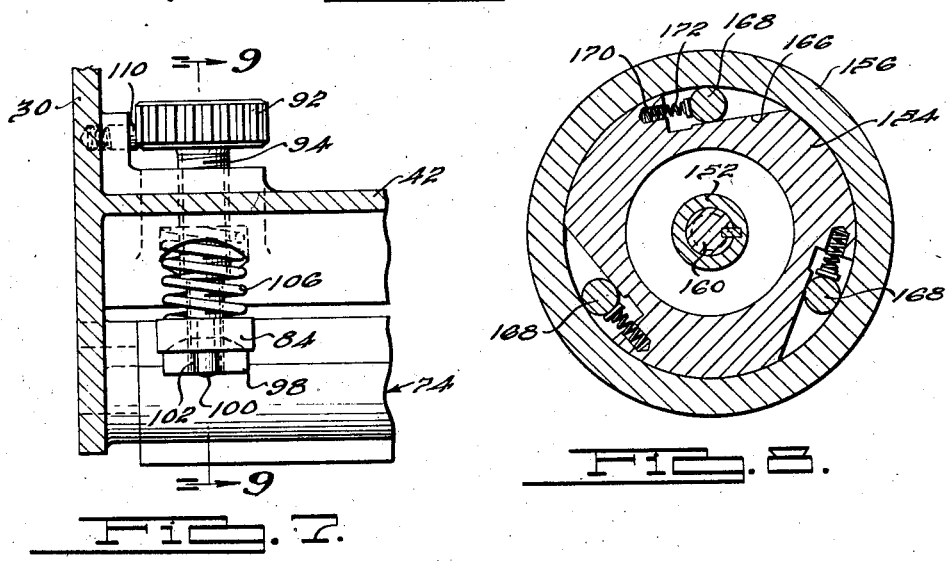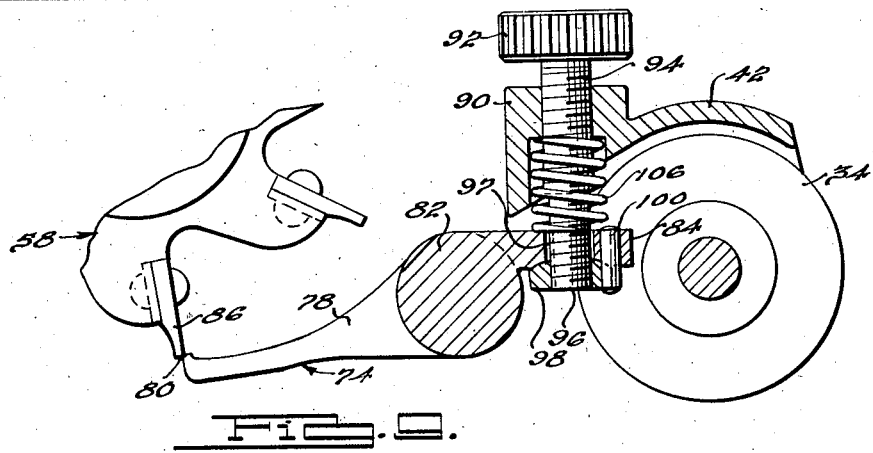

May 7, 1940.     H. C. LIMBACH     2,199,919
LAWN MOWER
Filed June 28, 1937     4 Sheets-Sheet 4
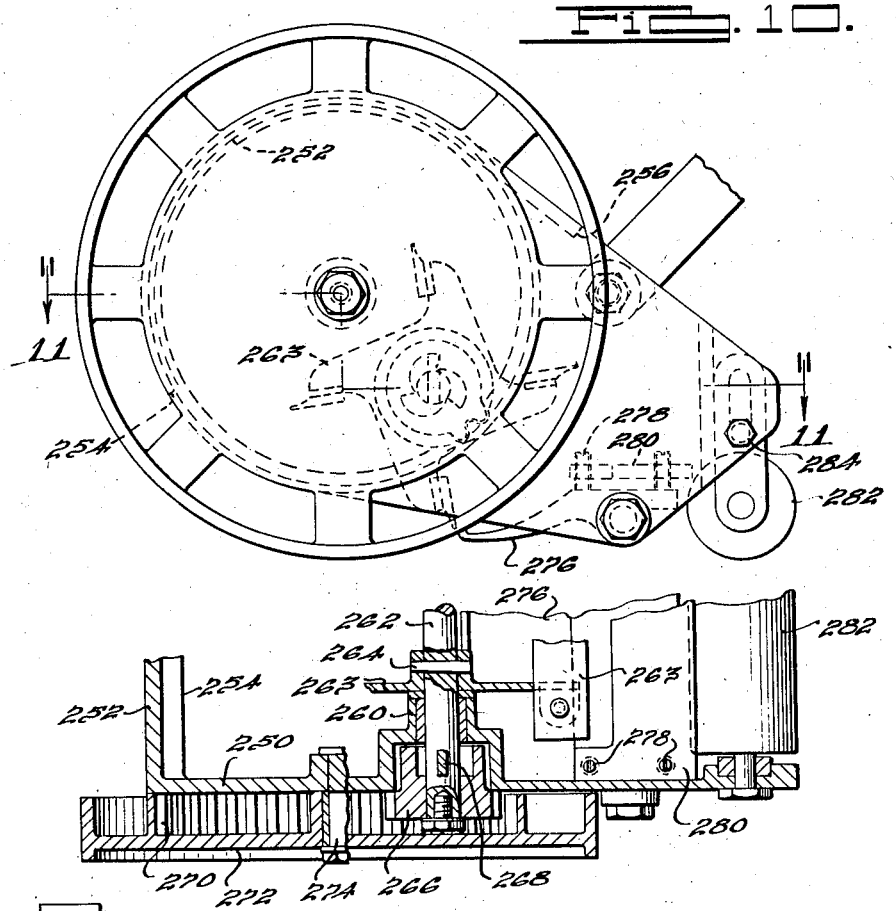
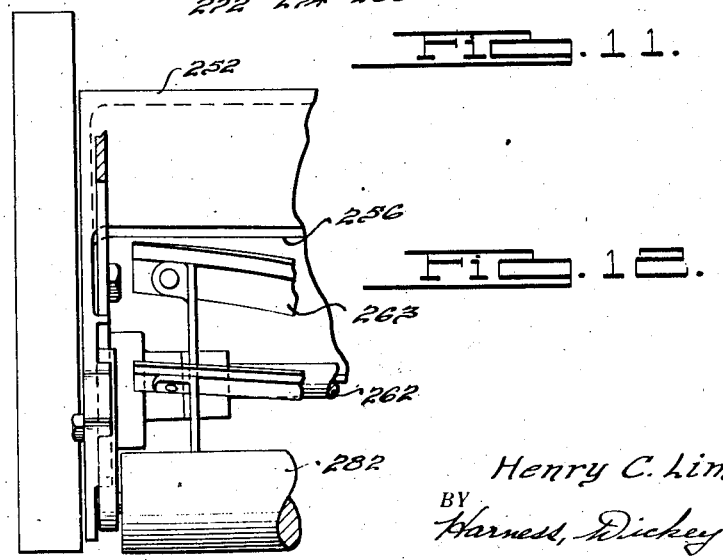
INVENTOR
Henry C. Limbach.
BY
Harness, Dickey & Pierce.
ATTORNEYS.

Patented May 7, 1940

2,199,919

UNITED STATES PATENT OFFICE 2,199,919

LAWN MOWER

Henry C. Limbach, Detroit, Mich., assignor to Product Development Quest, Inc., Detroit, Mich., a corporation of Michigan Application June 28, 1937, Serial No. 150,712

17 Claims. (Cl. 56—253)

This invention relates to lawn mowers, the principal object being the provision of a lawn mower that is extremely sturdy in construction and one that will permit ready adjustment of the adjustable parts thereof and will efficiently maintain such parts in their intended position determined by the adjustment.

Objects of the invention include the provision of a lawn mower structure particularly designed to resist any relative displacement between the parts thereof which would modify or change the adjusted position of the cutter bar with respect to the cutter reel; the provision of a lawn mower provided with a main frame member and co-operating supports for the cutter reel and cutter bar so constructed and arranged as to be substantially non-yielding under impacts of the type usually met with in service whereby to enable the clearance between the cutter reel and the cutter bar to be maintained under all conditions of operation; the provision of a main frame member for a lawn mower comprising a barrel-like structure of integral formation adapted to substantially enclose a cutter reel and provided with openings therein for the admission of grass to the reel and the ejection of grass therefrom; the provision of a lawn mower having a barrel-like main frame member enclosing the cutter reel, and supplementary members associated with opposite end portions thereof having relatively large areas of contact with respect thereto for supporting both the cutter reel and the cutter bar in predetermined relation with respect to each other; the provision of a simple and effective means of adjusting the cutter bar of the lawn mower with respect to the cutter reel thereon; the provision of a lawn mower in which the wheels are bodily shiftable with respect to the cutter reel together with a simple and novel form of means permitting adjustment between the wheels and the reel operable to quickly and effectively lock them in a predetermined position with respect to each other; and the provision of a novel handle structure for a lawn mower.

The above being among the objects of the present invention, the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views, Figure 1 is a perspective view of a lawn mower embodying various features of the present invention;

Fig. 2 is an enlarged partially broken, partially sectioned end elevational view of the lawn mower shown in Fig. 1;

Fig. 3 is a fragmentary sectional view taken on the line 3—3 of Fig. 2;

Fig. 4 is an enlarged fragmentary sectional view taken on the line 4—4 of Fig. 2 and illustrating in greater detail the means for locking the wheels in their adjusted position relative to the main frame of the lawn mower;

Fig. 5 is a vertical sectional view taken on the line 5—5 of Fig. 3;

Fig. 6 is a fragmentary sectional view taken axially of the cutter reel of the lawn mower as on the line 6—6 of Fig. 5;

Fig. 7 is an enlarged fragmentary vertical sectional view taken on the line 7—7 of Fig. 5 and illustrating the adjusting mechanism for the cutter bar in greater detail;

Fig. 8 is an enlarged transverse sectional view taken on the line 8—8 of Fig. 3 and illustrating the construction of the over-running clutch provided between the driving wheels and the cutter reel;

Fig. 9 is a fragmentary transverse sectional view taken on the line 9—9 of Fig. 7;

Fig. 10 is an end elevational view of a lawn mower showing the application of the present invention to a lawn mower of conventional construction;

Fig. 11 is a fragmentary sectional view taken on the line 11—11 of Fig. 10;

Fig. 12 is a fragmentary plan view of the lawn mower shown in Figs. 10 and 11.

While certain features of the present invention are particularly applicable to the lawn mower construction shown and claimed in my co-pending application for Letters Patent of the United States for improvements in Lawn mowers, filed July 12, 1934, Serial No. 734,769, now issued as Patent No. 2,091,077, and, therefore, the present invention may be considered as an improvement over the invention disclosed and claimed in my prior application, its principles are also broadly applicable, for the most part, to lawn mowers of conventional construction. The lawn mower shown in my co-pending application above referred to was designed to provide an unusually rigid structure. However, one feature of its construction was similar to conventional lawn mowers in that a pair of end frame members shown in the preferred form as being of cast construction were secured in fixed relation with respect to each other by a plurality of rods extending between them, the rods having reduced end portions projecting through the frame portions and provided with nuts on the outer side to draw the frame portions up securely against the shoulders formed at the junction of the reduced end portions with the main body portions of the rods. In the construction shown in my prior patent an unusual number of such rods or the equivalent thereof were purposely provided with the idea in mind of maintaining the end frame members in rigid relation with respect to each other and such type of construction was provided under the assumption that this type of construction in conventional lawn mowers would provide the necessary rigidity required to maintain the cutter bar and the cutter reel in proper relation to each other when once properly adjusted. However, it was found that in spite of the unusually large number of interconnecting rods employed in my former construction, if the cutter bar was adjusted relative to the cutter reel so as to provide a working clearance of from zero to five one-thousandths of an inch between them and one wheel of the lawn mower for instance was driven against a curb, stone, or other solid obstruction with sufficient force, the proper alignment between the two end portions would be disrupted with the result that the adjusted and intended clearance between the cutter bar and the cutter reel was disrupted. Further investigations disclose that this trouble would occur in all conventional constructions which probably explains the prevalent practice of adjusting the cutter bar so that the cutter reel will rub against it during operation, a feature which, as will be apparent, is actually undesirable in practice because it has the effect of wearing down the sharp edges on the cutter reel and the cutter bar and unless very carefully adjusted materially increases the power required to drive the lawn mower and thus renders the cutting of grass with it a tiresome and unwelcome job. I have found that it is possible to properly cut substantially all grades of grass with a lawn mower in which the cutter reel is given a working clearance up to five one-thousandths of an inch with respect to the cutter bar and, accordingly, that it is desirable to so adjust the cutter bar with respect to the cutter reel that an actual working clearance exists between them less than five one-thousandths of an inch but nevertheless such as to prevent actual contact between the cutter bar and the cutter reel.

In accordance with the present invention in order to enable such close adjustment to be made between the cutter bar and the cutter reel and to enable such adjustment to be maintained over long periods of continuous service during which the lawn mower may be subjected to the usual severe usage commonly met with in practice and including running of the same against solid and substantially immovable objects, a construction is provided in which the usual end frame members and connecting bars of conventional lawn mower constructions are eliminated and in their place is substituted a main frame member which, for ease of description, may be referred to as of "barrel-like" construction in which the cutter reel is adapted to be substantially enclosed, this barrel-like main frame member being provided with removable end members rigidly secured thereto over a relatively large area so as to eliminate the possibility of their shifting with respect thereto and which end members carry, either directly or indirectly, both the cutter bar and the cutter reel. The barrel-like main frame member, because of its barrel-like characteristics, is extremely rigid and unyielding to shocks and blows and for this reason the end frame members, being secured thereto over a relatively large area of contact, are immovably maintained with respect to one another and consequently permit an adjustment of the normal running clearance between the cutter bar and the cutter reel to be established and maintained with unvarying accuracy despite shocks to the structure which would render the adjustment between the cutter bar and the cutter reel of a conventional lawn mower quickly inoperative. In view of the fact that the barrel-like main frame member substantially encloses the cutter reel it will, of course, be understood that the main frame member must necessarily be provided with suitable openings through the side walls thereof to permit the admission of grass to between the cutter blades of the reel and the cutter bar and also that the walls of the main frame member must be provided with a suitable opening or openings permitting the grass cut by the lawn mower to be ejected from the interior of the main frame member.

In my prior co-pending application above referred to a novel form of mechanism for adjusting the position of the cutter bar with respect to the cutter reel is provided, including a plurality of cam elements, by means of which the position of the cutter bar with respect to the reel over the entire length thereof may be adjusted through a simple control means. While such mechanism there shown is satisfactory in operation I have found it unduly expensive to manufacture and, accordingly, in the construction herein shown and described I have provided a novel form of adjustment means for the cutter bar that not only is simple in construction and economical to produce but further permits extremely accurate adjustment of the cutter bar with respect to the cutter reel and acts to maintain the adjusted position of the cutter bar when once properly adjusted.

In my co-pending application above identified a handle structure is provided which enables the handle to be moved into approximately vertical position and to hold the handle in such position as an aid in storing of the lawn mower, for instance, during inoperative periods. I have found, however, that it is desirable to provide means whereby the handle may be adjustably maintained in a plurality of various positions during normal operation and, accordingly, in accordance with a further feature of the present invention means are provided for this purpose, such means being simply operable whereby the position of the handle may be quickly and readily varied to suit the desires of the operator.

Referring to the drawings and particularly to Fig. 1 the lawn mower there shown includes a main frame unit indicated generally at 20 provided at either end thereof with a pivotally connected chain housing indicated generally at 22 each of which is provided outwardly thereof with a driving and supporting wheel indicated at 24, together with a handle structure indicated generally at 26, the specific details of each of which will hereinafter be described in detail. Referring now particularly to Figs. 3 and 5, it will be noted that the main frame unit 20 includes a main frame member having opposed parallel substantially flat end portions 30 and each of which, as indicated in Fig. 5, is provided with a rearward and downward extending projecting portion or tail 32 and between which the fulcrum roll 34, to be hereinafter more fully described, extends and is rotatably mounted. The end plate portions 30 are rigidly and immovably secured together over their forward and upper peripheral portions by means of a curved wall 36 preferably formed integrally therewith and extending from a point or horizontal line 38 at the front of the mower sufficiently high to permit grass of normally maximum height adapted to be cut by the mower to enter therebelow, and to a point 40 at the rear of the mower at a sufficient height above the ground to permit the cut grass discharged by the cutter reel to be thrown outwardly and upwardly into a grass catcher when employed. An additional curved wall 42 extends between and is integrally connected to the tail portions 32. Because of the curved nature of the walls 36 and 42 and their relatively great combined width, and particularly in view of the fact that the wall 36 is extended to such an extent as to be substantially semi-cylindrical in conformation it will be understood that the main frame member is of exceedingly rigid nature and of such strength and rigidity as to be substantially unyieldable to any shocks or blows that a lawn mower may be expected to encounter during usual but rough usage. This main frame member may be well likened in its nature to a barrel in which slots, corresponding to the spaces left between the edge 38 and the adjacent edge of the wall 42 and the edge 40 and the adjacent edge of the wall 42 are formed to permit the entrance of the grass to the cutter reel and the ejection of the cut grass therefrom, and it will have the strength of construction and the resistance to deformation, distortion and warpage that is expected to be found in a barrel-like structure. This frame structure may be of cast construction in which event the end walls 30 and connecting walls 36 and 42 will preferably be cast integrally therewith, or may be made separately of plates or stampings in which case they will preferably be riveted or welded together.

Each end portion 30 of the main frame is provided in its lower portion with a preferably circular stepped opening 46 therein and received in each of the openings 46 and accurately piloted therein with its outer surface preferably in flush relationship with the outer surface of the corresponding portion 30, as indicated in Fig. 3, is a generally plate-like member 48. The members 48 are each secured rigidly with respect to their corresponding end portions 30 by means of a plurality of screws 50, best indicated in Figs. 5 and 6 and the heads of which are preferably located in flush relation with respect to the outer face of the corresponding portions 30 and members 48 as indicated in Fig. 6.

As best indicated in Figs. 3, 5 and 6 each plate member 48 is provided with an aperture 52 therethrough, and although not necessary or even desirable under some circumstances it is shown in the drawings as being located centrally of the plate member 48. On the inner face of each plate member 48 surrounding the corresponding opening 52 is an inwardly projecting annular boss 54 within which a suitable anti-friction bearing assembly 56 is located and secured. The cutter reel which is indicated generally at 58 and which may be of generally conventional construction is provided with a shaft 60, the opposite end portions of which are rotatably received within the corresponding bearings 56 and the outer ends of the shaft 60 project outwardly into substantially flush relationship with the outer face of the corresponding plate members 48. A chain sprocket 62 is located axially of and secured to the outer face of each end of the shaft 60 by means of a screw 64 and a tongue and groove connection 66 provided between the hub of each sprocket 62 and the corresponding end of the shaft 60 forms the driving connection between the sprockets 62 and the cutter reel. The diameter of at least one of the openings 46 in the end portions 30 of the main frame is sufficiently large to permit insertion and removal of the cutter reel 58 therethrough upon removal of the corresponding plate member 48.

As indicated best in Figs. 5 and 6 each plate member 48 is provided at its lower rearward portion with a rearwardly extending projection 70 provided with an opening 72 therethrough. The apertures 72 are each formed with their axis parallel with respect to the axis of the bearing 56 in the corresponding plate 48 and at an accurately gauged center distance between them. The cutter bar which is indicated generally at 74 is provided with a relatively short axially projecting journal or pin portion 76 at the opposite ends thereof and each journal portion 76 is rotatably received in the corresponding opening 72. Accordingly, it will be observed that the plate members 48 accurately space the cutter reel 58 from the cutter bar 74 and it will be apparent that because of the relatively large area of contact between each plate member 48 and its corresponding end wall portion 30 of the main frame member, when these parts are accurately located with respect to each other and locked in their assembled position it will be substantially impossible in any ordinary rough usage of the lawn mower to so spring, distort or otherwise rack this portion of the lawn mower sufficiently to disrupt the properly adjusted relation of the cutter bar with respect to the cutter reel.

With the above described construction it will be apparent that the rotatable positions of the plates 48 in the openings 46 of the main frame must be accurately controlled in order to bring the axes of the openings 72 into substantially exact alignment, otherwise it would be impossible to obtain a uniform working clearance between the straight cutting edge of the cutter bar 74 and the cutting edges of the cutter reel 58 over the full length of the cutter bar. This accuracy of location of the plates 48 is obtained during assembly, the cutter reel and cutter bar being mounted therein and adjusted, while the plates 48 are relatively rotatably adjustable in their openings 46, until a uniform clearance between the reel and cutter bar over the full length of the latter is obtained. The plates 48 are then temporarily locked in position, and the overlapping portion of each plate 48 with the end wall 30 of the main frame is then drilled and reamed for reception of a dowel 77 which thereafter serves to accurately locate such plate with respect to the frame. The holes for the screws 50 may then be drilled and tapped and the screws inserted in place, but ordinarily it will be found better manufacturing practice to drill and tap the parts for the screws before assembly, leaving sufficient clearance for the screws to permit the above described rotatable adjustment prior to machining for the dowels.

Although in the broader aspects of the present invention the particular construction of the cutter bar 74 is more or less unimportant as long as it is of suitable strength and rigidity to serve the desired purpose, the particular construction shown in the drawings comprises a main body portion 78 formed from sheet metal into a hollow structure to provide a cutting edge 80 and separately formed end members 82 fitted into the opposite ends of the main body portion 78 and suitably welded, brazed, or otherwise fixed therein. Each of the end members 82 is provided with a rearwardly extending lug portion 84 for the purpose of enabling adjustment of the cutter bar 74 about the axes of its pins 76 in order to adjust the relation between the cutting edge 80 and the various blades 86 of the reel 58.

Adjustment of the cutter bar 74 with respect to the reel 58 is accomplished in the manner indicated best in Figs. 7 and 9 from which it will be noted that the transverse wall 42 immediately above each of the lugs 84 is provided with an upwardly extending boss 90 downwardly through which a screw member 92 is threaded. Each screw member 92 includes a body portion 94 of one diameter and a body portion 96 of a smaller diameter, both portions 94 and 96 being provided with screw threads of the same hand and the portion 96 having more threads per inch than the portion 94. As a matter of illustration it may be assumed that the portion 96 is provided with twenty-four threads to the inch while the portion 94 is provided with twenty threads to the inch. The portion 94 is threadably received within the boss 90 and the portion 96 passes loosely through an elongated hole 97 in the corresponding lug 84 and is threadably received in a nut 98 lying below such corresponding lug 84. The co-operating faces of the lugs 84 and nuts 98 are spherically curved to permit the nuts 98 to angularly adjust themselves to accommodate the angular position of the cutter bar. A coil spring such as 106 is provided in surrounding relation with respect to each screw 92 and constantly maintained under compression between each lug 84 and its corresponding boss 90 in the manner indicated in Fig. 9 so as to constantly urge the lugs 84 into contact with their respective nuts 98. A pin 100 fixed in each lug 84 is received in a slot 102 in the corresponding nut 98 and prevents the nut from rotating. Inasmuch as the required range of pivotal movement of the cutter bar 74 is extremely small the ability of the nuts 98 to adjust themselves on their seats will ordinarily take care of all the adjustment of the cutter bar required in service, but this range may be increased by providing a somewhat loose fit between the portion 94 of the screw 92 and the boss 90, but the looseness of such fit does not need to be excessive and in any event the spring 106 exerts a material axial force between the threads on the screw 92 and the threads in the boss 90 whereby to normally prevent any axial play between them. In order to prevent any possibility of inadvertent rotational movement of the screws 92 it is preferable, as illustrated in Fig. 7, to provide a spring pressed plunger 110 in the inner face of each corresponding frame portion 30 which is constantly urged outwardly against the serrated outer face of the heads of the screw 92, the end of the plungers 110 being formed to engage in such serrations so as to frictionally hold the screw 92 against turning, yet being of such a nature as to permit it to be turned manually for adjusting purposes. The above described construction also has an important advantage in that in event a stone, stick or the like becomes caught between the cutter reel blades and the cutter bar, the resulting downward pressure on the cutter bar cutting edge will act to compress the springs 106 and allow the cutting edge 80 to temporarily move away from the reel, thus eliminating the possibility of damage to these parts which might occur if they were relatively immovable.

The cutter bar 74 because of its hollow construction will be of maximum strength for the weight of metal provided and of such a nature as to most favorably resist bending and twisting thereof. Likewise the nature of the adjustment for the cutter bar 74 is such as to permit the cutting edges 80 thereof to be accurately controlled to a very minute degree. This, of course, is obtained because of the differential action of the screw 92. This will be particularly understood when it is realized that with the number of threads previously mentioned for the portions 94 and 96 of the screw 92 one full turn of the screw 92 will cause an axial displacement of the lug 84 with respect to the boss 90 of only one 120th of an inch.

As best indicated in Figs. 3 and 5 the outer extremities of each of the tail portions 32 of the end wall portion 30 of the main frame are provided with an inwardly bossed stepped opening 114 therein in each of which is threadably received a member 116 having a hollow inner end portion 118 projecting inwardly beyond the inner face thereof. Supported and located between the hollow extensions 118 is a shaft 120 one end of which is provided with an axially parallel but eccentric pin 122 which is received in a matching opening formed in the member 116 so as to positively lock the shaft 120 from relative rotation with respect to the members 116. Rotatably received upon the shaft 120 and extending between opposite members 116 is the fulcrum roll 34, corresponding to the fulcrum roll shown and described in my co-pending application above referred to to all intents and purposes.

The outer face of each of the members 116 is centrally provided with a threaded opening in which the threaded inner end of a pin 130 is received and which pin projects axially outwardly therebeyond. Immediately adjacent each member 116 a sprocket member 132 is rotatably received upon the corresponding pin 130 and this sprocket member is connected by means of a chain 134, as indicated in Fig. 2, with the corresponding sprocket 62 on the shaft 60 of the cutter reel 58. Immediately outwardly of each sprocket 132 a second sprocket 136 is rotatably received upon each pin 130 and is provided with a tongue and groove connection 138 with the corresponding sprocket 132 so as to drivingly connect these two sprockets. Outwardly of the corresponding sprocket 136 each pin 130 pivotally receives thereon the chain housing 22 at the corresponding end of the lawn mower.

Referring now to Figs. 2 and 3, it will be noted that each chain housing 22 comprises a hollow member which in side view as illustrated in Fig. 2 is of somewhat the same general contour as the end plates 30 of the main frame and includes an outer wall 140 and a peripheral wall or rim portion 142 bounded at its inner margin with an inturned flange 144, the inner face of which is planular and lies flat against the outer plane face of the corresponding end wall 30 of the main frame.

The outer wall 140 of each housing 22 is provided with a hollow bushed boss 146 whose axis is parallel to and preferably lies in approximately the same vertical plane as the axis of the cutter reel shaft 60 when the mower is adjusted for a normal cut. Each boss 146 rotatably receives therein a spindle member 148 which projects outwardly therefrom and to the outwardly projecting end of which is suitably fixed the corresponding driving wheel 24 which may be of any suitable construction but is shown for the purpose of illustration as being of substantially the same construction as shown in my prior patent application above identified. The inner end of each spindle 148 is reduced as at 152 and non-rotatably received thereon is an inner clutch member 154, shown in greater detail in Fig. 8. Rotatably mounted upon the inner clutch member 154 is an outer ring-like clutch member 156 which is maintained in radially aligned relation with respect to the clutch member 154 by bearing against the suitably machined inner face of the outer wall 140 and a disc-like plate member 158 mounted upon a screw 160 which is threaded into the extension 152 of the spindle 148 centrally thereof. Consequently each screw 160 cooperating with the corresponding plate member 158 also serves to maintain the corresponding clutch member 154 against the shoulder formed at the junction of the main body portion of the spindle 148 and the reduced portion 152 thereof and further serves to secure the corresponding wheel 24 against axial displacement with respect to the corresponding housing 22. Each outer clutch member 156 has suitably secured thereto as by welding a relatively large sprocket wheel 162 aligned with the corresponding sprocket 136 on the pin 130 and drivingly connected thereto by means of a chain 164 as indicated in Fig. 2.

Referring to Fig. 8 each inner clutch member 154 is provided in its periphery with a plurality of triangularly shaped notches 166, three being shown by way of illustration, and in each notch 166 a roller 168 is received with its axis in parallel relation to the axis of the spindle 148. The notches 166 preferably have their walls arranged at right angles to each other and with one wall considerably longer than the other and a hole 170 is drilled into each of the short walls in a direction normal thereto and receives therein one end of a compression spring 172 maintained under compression between the blind end of the hole and the corresponding roller 168. The rollers 168 are of such diameter as to bear both against the long wall of the corresponding notch 166 and the inner surface of the outer ring-like clutch member 156 and towards which position they are constantly urged by the corresponding springs 172. The notches 166 are so arranged with respect to the clutch members 154 that when the wheels 24 are turning in a counter-clockwise direction of rotation, as viewed in Figs. 2 and 8, the inner clutch members 154 in turning with the wheels will, because of the friction of the rollers 168 with both the members 154 and 156, tend to cause the rollers to be carried towards the small end of the corresponding notch 166 and consequently lock the clutch members 154 and 156 together for equal rotation whereby the rotational movement of the wheels will drive the sprocket 162 which, acting through the chain 164, sprockets 136 and 132, chain 134 and sprocket 62 will cause the cutter reel 58 to be driven at a relative speed depending upon the driving ratio established by the differences in size and arrangement of these sprockets. This ratio may, of course, be such as to obtain any desired turns of the cutter reel to each complete revolution of the driving wheels, but in the construction shown as a matter of illustration the cutter reel will turn approximately five revolutions to each revolution of the driving wheel during forward movement of the lawn mower. At any time that the momentum of the cutter reel and connected parts tends to drive the wheels 24, or whenever the lawn mower is moved in a rearwardly direction as respects its normal direction of travel, the friction between the rollers 168 and coacting surfaces of the clutch members 154 and 156 will tend to move the rollers 168 in opposition to their corresponding springs 172 towards the deeper end of their respective notches 166 and consequently will release the members 154 and 156 from driving engagement with respect to each other. Consequently the clutch structure illustrated in Fig. 8 provides a one-way clutch between the wheels and the cutter reel of such nature as to drive the cutter reel in one direction only and during forward movement of the lawn mower only for obvious reasons.

In view of the fact that the main housing 20 and the chain housings 22 are pivotally mounted with respect to each other about the axes of the pins 130 which are offset from both the axes of the wheels and the cutter reel, and in view of the fact that the cutter reel is carried by the main frame 20 and the wheels carried by the chain housings 22, it will be apparent that relative pivotal movement between the main frame 20 and the chain housings 22 will vary the height of the cutting edge 80 of the cutter bar 74 with respect to the ground and consequently the height of cut of the lawn mower may be adjustably controlled by controlling the pivotal relationship between these parts. In order to enable both chain housings 22 to be adjusted to the same relative position with respect to the main frame 20 and to be locked in such adjusted position, the wall 142 of each housing 22 at a point thereon substantially at the greatest distance from the pivotal point of the housing is interiorly provided immediately adjacent the flange 144 with an inwardly projecting hollow boss 180 in which is axially slidably received a rod 182 the inner end of which is bent into a hook 184 and the outer end which projects outwardly beyond the outer face of the housing 22 is threaded as at 186 and receives thereon a hand nut 188. The flange 144 of each housing 22 is deepened adjacent the boss 180 and is notched at its inner edge as at 190 for reception of the corresponding hook end 184 thereby to prevent its rotation, and the corresponding end wall 30 of the main frame 20 is provided with an arcuate slot 192, best shown in Figs. 2, 4 and 5 arranged with its center coincident to the axes of the pins 130 and through which the extreme tip of the corresponding hook end 184 of the rod 182 projects. The axially inner radially outer edge of each slot 192, as best indicated in Fig. 5, is provided with a plurality of spaced notches 194 in which the corresponding hooked end 184 is receivable. As illustrated in Fig. 4 when the hooked end 184 is received in one of the notches 194 and the hand nut 188 is tightened down on the end of the corresponding rod 182 the hooked end 184 in being drawn outwardly by the nut 188 causes the housings 22 and 20 to be drawn axially toward one another and clamped securely together against pivotal movement with respect to each other and consequently locks the corresponding housing 22 securely in adjusted relation with respect to the main frame 20. Preferably a coiled spring such as 196 provided in surrounding relation with respect to the hub portion of the hand nut 188 is constantly maintained under compression between the hand nut 188 and a suitable washer 198 surrounding the rods 182 between the housing 22 and the hand nut for the purpose of preventing disengagement of the hook 184 with a cooperating notch 194 until the hand nut 188 is pressed inwardly to cause the hook 184 to disengage a cooperating notch 194. The spring 196 is of sufficient strength to maintain the hooked end 184 in the corresponding notch 194 even though the hand nut 188 is backed off a sufficient amount to permit the rod 182 to be projected inwardly to a sufficient extent to permit relative pivotal movement between the housings 20 and 22, and thus permits the hook 184 to be temporarily projected into one or another of the notches 194 for trial purposes during adjustment, and without necessitating tightening of the hand nut 188 until the desired position of adjustment has been obtained.

It may be noted at this point that the weight of the lawn mower is transmitted to the ground through the wheels 24 and fulcrum roll 34. Unlike conventional constructions, however, the fulcrum roll 34 has nothing whatever to do with the height of cut produced by the lawn mower, this being for the reason that the line of engagement between the cutting edge 80 of the cutter bar 74 and the cutter reel 58 is approximately in vertical alignment with the axis of the wheels 24 and all adjustments of the height of cut is obtained through adjustment between the main frame member 20 and the housings 22. Having the line of cut in approximate vertical alignment with the axes of the wheels prevents scuffing of the turf and variation in height of cut by the lawn mower in going over a surface which is curved in the direction in which the lawn mower travels, thus eliminating a major fault in conventional constructions. This feature is not any part of the present invention but forms the principal subject-matter of my prior application previously identified herein.

It may also be noted at this point that similar to the construction shown in my prior application above referred to, simply by releasing the lock between one of the housings 22 and the main frame 20 through suitable loosening and inward pressing of one of the hand nuts 188 and removal of the corresponding screw pin 130, the corresponding housing 22, wheel 24 and cooperating parts may be removed from the corresponding end of the lawn mower and upon further removing the corresponding screws 64 and sprocket 62 such end of the lawn mower will be perfectly flat and will be closely approached by the corresponding end of the cutter reel 58, and yet the lawn mower will be sufficiently supported to permit it to be used for edging purposes, that is, mowing close to a wall or a fence. To aid in the stability of the lawn mower under such conditions a special handle construction is provided in accordance with the present invention which will permit the operator to readily maintain that end of the mower from which the wheel has been removed in its proper position with respect to the ground for cutting purposes.

Referring now to Figs. 1, 2 and 5, it will be noted that to the inner face of each tail portion 32 of each end wall 30 of the main frame 20 a peripherally serrated, notched or toothed member 210 is fixed against rotation in any suitable manner as, for instance, by means of a squared connection 212. Each member 210 has pivotally secured thereto a rearwardly and upwardly extending arm or link 214. The U-shaped handle 26 has its otherwise free ends pivotally secured to the arms 214 by means of suitable pivot pins 216. The extreme end portions of the handle 26 are each formed to provide an inwardly projecting tooth 218 engageable with the serrated outer surface of the member 210. The relation of these parts is such that when the handle 26 is caused to pivot about the pins 216 in a counter-clockwise direction of rotation as viewed in Figs. 2 and 5, the teeth 218 are caused to become disengaged from the serrated surface of the members 210 upon the occurrence of which the handle 26 and the arms 214 may be moved bodily together about the center of the serrated members 210, in either direction of rotation. When the handle 26 and arms 214 have thus been bodily rotated to a desired position, if the handle 26 is now caused to rotate in a clockwise direction about the pivot pins 216 the teeth 218 will again engage the serrated member 210 which will thereupon lock the handle 26 against further movement in a clockwise direction of rotation about the axes of the members 210. In order to effect this result the point of engagement between the teeth 218 and serrated surface of the members 210 will necessarily have to be on the righthand side of a line connecting the axes of the pins 216 and members 212 as viewed in Fig. 5. Also to permit upward movement of the upper end of the handle 26 to move it sufficiently about the axes of the pins 216 to release the teeth 218 from the periphery of the members 210 yet limit such movement to that not materially greater than required to effect such release and thereby facilitate thereafter the bodily movement of both handle and members 214 about the axes of the members 210, the end portions of the handle 26 at a point intermediate the axes of the pins 216 and members 214 are provided with slots 220 in each of which a pin 222 fixed to the corresponding arm 214 projects. The pins 222, by engagement with the end walls of their corresponding slots 220, limit the relative pivotal movement of the handle 26 with respect to the arms 214. With this construction by a simple upward movement of the outer end of the handle 26, the handle 26 may be moved to any desired position of adjustment including a substantially vertical position for storage or substantially horizontal position for mowing under a porch or the like, and the operator by giving the handle 26 a simple breaking type of movement may cause the teeth 218 to again engage the serrated outer surface of the member 210 so as to releasably lock the handle in such adjusted position.

Referring to Figs. 10, 11 and 12 the application of the frame structure of the present invention to a conventional type of lawn mower is shown. This lawn mower is provided with end frame 250 but instead of connecting these members 250 by means of a plurality of rods as used in conventional constructions as previously explained, they are connected together by means of a curved wall 252 preferably formed integrally therewith and extending between them. As in the construction previously described this curved wall terminates at its forward edge along a line 254 at a sufficient height above the ground to permit the longest grass intended to be cut by the mower to pass thereunder to a position to be acted upon by the cutter reel, and terminates at its rear edge along a line as at 256 at a sufficient height above the ground to permit grass cut by the lawn mower and thrown rearwardly and upwardly therefrom by its cutter reel to be caught in the grass catcher. The walls 252 being greater than semi-cylindrical extent provides a connection of extreme rigidity between the end plate or members 250 and of such nature as to prevent any possible shifting of one end member 250 with respect to the other thereof under any blows or shocks to which the lawn mower may possibly be subjected during usual but rough usage. Other than this particular feature the lawn mower shown in Figs. 10, 11 and 12 is of substantially conventional construction. In other words each end member 250 is provided with an inwardly extending hollow boss 260 between which the cutter reel shaft 262 is rotatably received, the cutter reel 263 itself being mounted upon the shaft 262 and maintained against relative rotation thereon by means of taper pins or keys 264. The outer ends of the shaft 262 projects outwardly into enlarged portions of the bore of the boss 260 where they are connected to a pinion 266 through a conventional lawn mower type of one-way clutch 268. The pinions 266 lie in mesh with an internal gear 270 formed on the interior of the corresponding wheels 272 which are rotatably mounted upon their corresponding end frame members 250 by means of suitable pins 274 suitably secured in such end frame members. A cutter bar 276 of conventional construction is pivotally mounted between the opposite end frame members 250 adjacent the rear end thereof and is adjustable to control the clearance between it and the cutter reel blades by means of a pair of screws 278 at each end thereof threaded downwardly through the rear cross bar or wall 280 connecting the corresponding end frame members 250. A conventional roller 282 is vertically adjustably mounted between the extreme rear end portion of the frame side members 250 and locked in vertically adjusted position by means of suitable bolts 284. In this construction in order to remove the cutter reel 263 it is first necessary to remove the wheels 272, then the pinions 266, drive out the taper keys 264 and pull the shaft 262 out through one end of the frame in order to drop the cutter reel out through the bottom. It will be apparent that with this modification of a conventional lawn mower construction it will be possible to adjust the clearance between the cutter bar 276 and cutter reel 263 to an extremely accurate extent and still be assured that the adjustment will be maintained during usual but rough operation of the mower. It will also be apparent that the same type of cutter bar adjustment and handle construction as described in connection with the preceding views may be employed with a conventional lawn mower but the showing of these features in Figs. 10, 11 and 12 is not believed necessary for a clear understanding of these additional changes to those skilled in the art.

Formal changes may be made in the specific embodiments of the invention described without departing from the spirit or substance of the broad invention, the scope of which is commensurate with the appended claims.

What I claim is:

1. In a lawn mower, in combination, a frame including end members, means rigidly connecting said end members comprising a curved wall extending therebetween and permanently fixed thereto, a cutter reel rotatably mounted in approximately housed relation with respect to said curved wall, a cutter bar operatively associated with said cutter reel, a pair of driving wheels, means supporting said frame from said driving wheels including members rotatably interconnected with said wheels and pivotable with respect to said frame about an axis eccentric to said wheels, and a driving connection between said wheels and said cutter reel.

2. A frame for a lawn mower comprising an approximately barrel-like structure including end members and curved circumferentially extending connecting members rigidly fixed with respect thereto, said connecting members having openings therein extending approximately from one end member to the other in approximate parallelism with the axis of said frame and interrupting the circumferential continuity thereof to permit the entrance of grass into and the egress of grass from the interior thereof, and at least one of said end members having an opening therethrough of a size sufficient to permit the passage of a cutter reel therethrough in an axial direction to permit positioning of a cutter reel within and removal of a cutter reel from the confines of said frame.

3. In a lawn mower, in combination, frame end members, a curved wall section of relatively great width as compared to its thickness extending between and permanently secured to said frame end members, at least one of said frame end members having an opening therethrough, a closure for said opening, a reel extending between said frame end members and one end thereof being rotatably supported by said closure, said closure being removably secured to its corresponding frame end member and said opening being of a size to permit insertion to and removal of said reel from operative position therethrough, a cutter bar arranged in co-operative relation with respect to said cutter reel, wheels arranged in supporting relation with respect to said frame end members, and means drivingly connecting said wheels and cutter reel.

4. In a lawn mower, in combination, frame end members, a curved wall section of relatively great width as compared to its thickness extending between and permanently secured to said frame end members, at least one of said frame end members having an opening therethrough, a closure for said opening, a reel extending between said frame end members and one end thereof being rotatably supported by said closure, said closure being removably secured to its corresponding frame end member and said opening being of a size to permit insertion to and removal of said reel from operative position therethrough, an extension on said closure, a cutter bar arranged in co-operative relation with respect to said reel and supported at one end by said extension, driving wheels arranged in supporting relation with respect to said frame and means drivingly connecting said wheels and cutter reel.

5. In a lawn mower, in combination, a frame comprising end members, a wall of relatively great width as compared to its thickness extending between said end members and rigidly fixed thereto over substantially the entire width of its marginal end portions, said end members being each provided with an opening therein, a bearing member received in each of said openings and secured therein relative to the corresponding frame end member, a cutter reel extending between and rotatably supported by said bearing members, at least one of said bearing members being removable and the corresponding opening in the corresponding frame end member being of sufficient size to permit passage of said cutter reel therethrough, said bearing members having a rearward projection, a cutter bar pivotally supported between said rearward projections, wheels arranged in supporting relation with respect to said frame, and means drivingly connecting said cutter reel and wheels.

6. In a lawn mower, in combination, a pair of spaced frame end members, tie means rigidly securing said end members with respect to each other, each of said end members having an opening therethrough, means bridging each of said openings for rotatably supporting a cutter reel, at least one of said bridging means being removable from its corresponding end member to facilitate removal of said reel from between said end members, a cutter reel rotatably mounted between said bridging means, each of said bridging means being further provided with a cutter bar support, a cutter bar received between said supports in co-operative relation with respect to said reel, wheels arranged in supporting relation with respect to said frame, and means drivingly connecting said cutter reel to said wheels.

7. A lawn mower including, in combination, a pair of spaced frame end members, means rigidly connecting said frame end members together, each of said frame end members having an opening therethrough, a bearing support secured to each of said frame end members over the corresponding said opening therein, at least one of said supports being removable from its corresponding end member whereby to facilitate removal of said reel from between said end members, a reel rotatably supported between said bearing members, said openings being of sufficient dimension to permit passage of said reel therethrough, a cutter bar arranged in co-operating relation with respect to said cutter reel, wheels arranged in supporting relation with respect to said frame end members, and means drivingly connecting said cutter reel and wheels.

8. In a lawn mower, in combination, a pair of spaced frame end members, means rigidly connecting said frame end members together, each of said frame end members having an opening therein, a reel supporting member secured to each of said frame end members in overlying relation with respect to the corresponding said opening therein, a cutter reel extending between and rotatably supported by said cutter reel supporting members, each of said cutter reel supporting members being provided with a cutter bar bearing therein, a cutter bar extending between and pivotally supported between the last mentioned bearings, dowel means co-operating between each of said cutter reel supporting members and the corresponding of said frame end members locating both said members in a predetermined position with respect to each other, said cutter reel supporting members being removable and said openings being of sufficient size to permit said cutter reel to be removed therethrough, wheels arranged in supporting relation with respect to said frame end members, and means drivingly connecting said wheels and cutter reel.

9. In a lawn mower, in combination, frame means, a cutter reel rotatably supported by said frame means, means at each end of said frame means pivotally connected thereto about a line spaced with respect to the axis of said cutter reel, a wheel rotatably supported by each of the second mentioned means about a line spaced with respect to the pivotal connection thereof with respect to said frame means, means drivingly connecting said wheels with said cutter reel, and means for locking each of said second mentioned means with respect to said frame means in adjusted relation about the pivotal axis between them comprising an axially slidable rod member carried by one of the first two mentioned means, a hook end on said rod member, a notched wall edge portion engageable by said hook end on the other of said first two mentioned means, and means for moving said rod member in an axial direction whereby to releasably secure said hooked end at a predetermined position in said notched edge.

10. In a lawn mower having a pair of parts arranged in pivotal relation with respect to each other, means for releasably securing said members in any one of a plurality of pivotally adjusted relation with respect to each other comprising, in combination, an axially movable rod supported by one of said members in spaced relation to the pivotal axis between said members, a hooked end on said rod, a notched wall edge on the other of said member arranged in co-operative relation with respect to said hooked end, and a nut for causing axial movement of said rod whereby to permit releasable engagement of said hooked end and said notched wall edge.

11. In a lawn mower having a pair of parts arranged in pivotal relation with respect to each other, means for releasably securing said members in any one of a plurality of pivotally adjusted relation with respect to each other comprising, in combination, an axially movable rod supported by one of said members in spaced relation to the pivotal axis between said members, a hooked end on said rod, a notched wall edge on the other of said member arranged in co-operative relation with respect to said hooked end, and a nut for causing axial movement of said rod whereby to permit releasable engagement of said hooked end and said notched wall edge, said hooked end and said notched wall edge being so constructed and arranged that operation of said nut to effect firm engagement between said hooked end and said notched edge will serve to clamp said members together in a direction parallel to the axis of the pivotal connection between them.

12. In a lawn mower having a pair of parts arranged in pivotal relation with respect to each other, means for releasably securing said members in any one of a plurality of pivotally adjusted relation with respect to each other comprising, in combination, an axially movable rod supported by one of said members in spaced relation to the pivotal axis between said members, a hooked end on said rod, a notched wall edge on the other of said member arranged in co-operative relation with respect to said hooked end, a nut for causing axial movement of said rod whereby to permit releasable engagement of said hooked end and said notched wall edge, and spring means interposed between said nut and the part in which it is supported constantly urging said rod member toward a position to effect engagement between said hooked end and said notched edge wall portion.

13. In a lawn mower of the class wherein a cutter reel and a cutter blade are arranged in co-operative relationship and driving wheels are operatively connected to the reel, the combination of a frame including end members and means including a curved wall section permanently and rigidly interconnecting said end members, at least one of said end members having an opening therein of a size sufficient to pass said reel therethrough, and removable means rigidly interconnected with said one of said end members for rotatably supporting the corresponding end of said reel.

14. In a lawn mower, in combination, a frame comprising end members, a wall of relatively great width as compared to its thickness extending between said end members and rigidly fixed thereto over substantially the entire width of its marginal end portions, said end members being each provided with an opening therein, a bearing member received in each of said openings and secured therein relative to the corresponding frame end member, a cutter reel extending between and rotatably supported by said bearing members, at least one of said bearing members being removable, said bearing members having a rearward projection, a cutter bar pivotally supported between said rearward projections, wheels arranged in supporting relation with respect to said frame, and means drivingly connecting said cutter reel and wheels.

15. A lawn mower including, in combination, a pair of spaced frame end members, means rigidly connecting said frame end members together, each of said frame end members having an opening therethrough, a bearing support secured to each of said frame end members over the corresponding said opening therein, at least one of said supports being removable from its corresponding end member, a reel rotatably supported between said bearing members, a cutter bar supported by said bearing members in cooperating relation with respect to said cutter reel, wheels arranged in supporting relation with respect to said frame end members, and means drivingly connecting said cutter reel and wheels.

16. In a lawn mower structure, in combination, a pair of spaced frame end members, tie means rigidly securing said end members with respect to each other, a supporting member secured to each of said end members, at least one of said supporting members being removable, a cutter reel rotatably supported between said supporting members, and a cutter bar supported between said supporting members in operative relation with respect to said reel.

17. In a lawn mower structure, in combination, a pair of spaced frame end members, tie means rigidly securing said end members with respect to each other, a supporting member secured to each said end member, a cutter reel rotatably supported between said supporting members, a cutter bar supported between said supporting members in operative relation with respect to said reel, at least one of said supporting members being rotatable relative to its corresponding said end member whereby to permit adjustment of said reel and cutter bar to effect parallelism thereof, and means for locking said one of said supporting members in its adjusted position.

HENRY C. LIMBACH.